July 18, 1967 — M. WALTON — 3,331,274
FLATHEADED ONE-WAY SCREW
Filed June 1, 1965
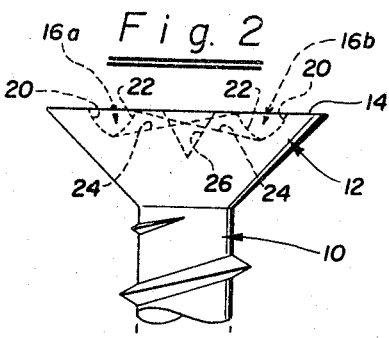
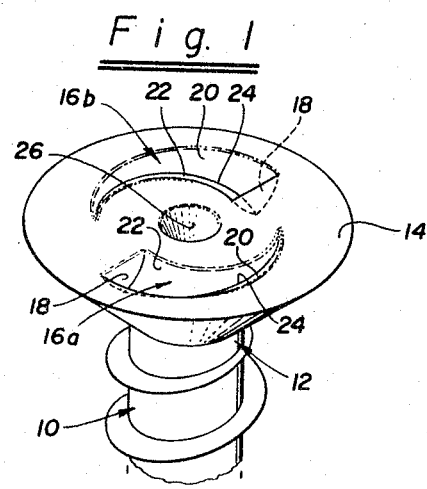
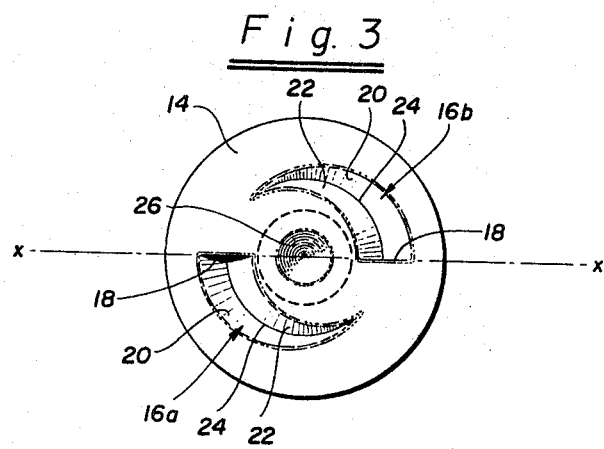
INVENTOR
Marvin Walton United States Patent Office 3,331,274
Patented July 18, 1967

3,331,274
FLATHEADED ONE-WAY SCREW
Marvin Walton, 134 Tuscaloosa Ave.,
Atherton, Calif. 94025
Filed June 1, 1965, Ser. No. 460,051
2 Claims. (Cl. 85—45)

The present invention relates to one-way screws, i.e. screws that can effectively be operated in one direction only and, therefore, cannot be withdrawn by conventional screw driving tools once they have been driven into position. Screws of this type are used in the construction of apparatus, or in the securement of apparatus to their places of use, when it is undesirable to have the apparatus disassembled or removed from their places of use by unauthorized or incompetent persons.

The heads of most screws of this type provide abutment surfaces in diametrically opposite areas thereof for effective engagement by a drive tool when the screw is to be driven into an object, and rearwardly of these abutment surfaces, i.e. in a direction opposite to the direction in which the screw is driven into position, the screw head is provided with inclined camming ramps along which a drive tool is cammed out of engagement with the screw head when its operation is reversed. Hence, it is impossible to withdraw the screw by reversal of the screw driving means, once the screw has been driven into position.

It is an object of my invention to provide a flat headed-one-way screw of the type referred to, that may smoothly be engaged by high speed power tools and from which such tools may easily and dependably be disengaged upon reversal in the operation of the tools.

It is another object of the invention to provide a flat-headed one-way screw wherein the excisions provided in the head surface of the screw to form the above described driving abutments and camming ramps, do not form peripheral edges such as might injure the hands of an operator that may handle an article into which the screw has not been fully driven.

More particularly, it is an object of the invention to furnish a flat-headed one way screw that cannot easily be tampered with to provide abutments for reverse operations of the screw.

These and other objects of the invention will be apparent from the following description of the accompanying drawing which illustrates a preferred embodiment thereof and wherein FIGURE 1 is a fragmentary perspective of a one-way screw embodying my invention;

FIGURE 2 is a fragmentary side elevation thereof; and

FIGURE 3 is a plan view of the screw shown in FIGURES 1 and 2.

The screw of the invention comprises a threaded stem 10 which carries a head 12 in the form of an inverted cone that has a flat circular end surface 14. Provided in diametrically opposite areas of said end surface are excisions or indentations 16a and 16b each forming an abutment surface 18 for engagement by a drive tool. Said abutment surfaces lie in a common plane x—x containing the axis of the screw (FIGURE 3) and face in the direction opposite to the direction in which the screw is to be driven into position, and they have approximately the contour of an inverted isosceles triangle whose base lies in the end surface 14. In a direction away from the abutment surfaces 18, the excisions 16a and 16b form curved grooves that have converging side walls 20 and 22 and whose bottom lines 24 corresponding to the apex of the inverted triangle defined by the abutment surfaces, rise gradually to the level of the flat end area 14 of the screw head along a circle that is concentric with the axis of the screw. In the preferred embodiment of the invention illustrated in the accompanying drawing, the side walls 20 and 22 of said grooves are slightly curved such as shown in FIGURES 1 and 2 wherein they are indicated as having a slight concavity. Furthermore, the top edges of the excisions 16a and 16b, i.e. the edges formed by said excisions with the top surface 14 of the screw head are preferably chamfered as indicated in FIGURES 1 and 3, to avoid vibrations when the drive tool is applied to the screw head, and to facilitate application of the drive tool in general. For the same reason an indexing hole of inverted conical conformation may be provided in the end surface 14 coaxially with the screw, as shown at 26.

The screw head of the invention may be effectively engaged and turned in a clockwise direction, as viewed in FIGURE 3, by a suitable rotary tool which engages the abutment surfaces 18. However, once the screw has been driven into position, it is impossible to withdraw it by reversal in the operation of the tool. The drive tool is simply cammed out of engagement with the screw head by the rising bottom lines 24 of the indentations or excisions 16a and 16b. Due to the fact that the indentations in the screw head of the invention do not present a flat floor to the outside, but are defined by converging side walls 20 and 22, and due to the fact that these converging side walls are not flat, but are preferably convex or concave, as shown, it is very difficult for anybody to inscribe notches or dents into the surfaces that define the excisions 16a and 16b, for the purpose of creating abutment areas for reverse rotation of the screw. Furthermore, the excisions as provided in accordance with the invention are such that they do not form peripheral edges or projections such as may injure an operator's hand. They are entirely removed from the circular edge of the screw head, and therefore present no danger to an inexperienced operator.

While I have explained my invention with the aid of a particular embodiment thereof, it will be understood that the invention is not limited to the specific constructional details shown and described by way of example, which may be departed from, without departing from the spirit and scope of the invention.

I claim:

1. A one-way screw comprising a threaded stem and on said stem a head having a flat circular top surface containing an indexing hole in coaxial alignment with said stem and in diametrically opposite areas indentations of substantially triangular cross-sectional contour forming at one end thereof abutment areas located in a plane containing the axis of the screw stem and having side walls of a concave cross-sectional contour and bottom lines corresponding to the apex of the triangle which rise along a circle coaxial with the screw stem to the level of said flat top surface.

2. One-way screw according to claim 1 wherein the outer edges of said indentations are chamfered.

References Cited

UNITED STATES PATENTS 3,178,988    4/1965    Borup _____ 85—45

FOREIGN PATENTS 1,232,468    4/1960    France.
    1,563    8/1912    Great Britain.
  138,281    2/1920    Great Britain.
  201,705    3/1939    Switzerland.

CARL W. TOMLIN, Primary Examiner.

M. PARSONS, Jr., Assistant Examiner.